Figure 2:
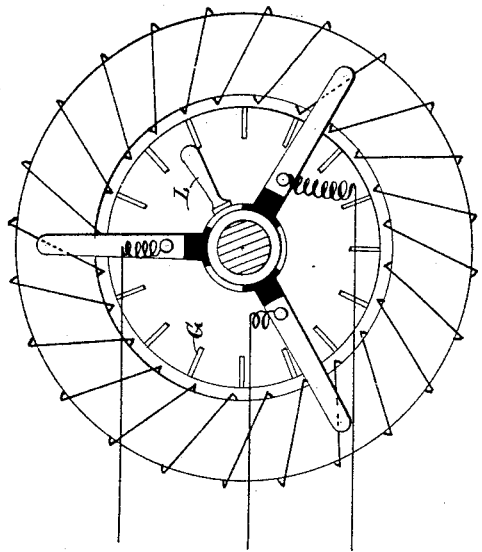

(No Model.) 3 Sheets—Sheet 1.

C. S. BRADLEY.
ALTERNATING CURRENT ELECTRIC MOTOR.

No. 514,903. Patented Feb. 20, 1894.

Attest:
C. H. Benjamin
J. E. Spaeth

Inventor:
Charles S. Bradley
by Read & Price
his attys.

(No Model.) 3 Sheets—Sheet 2.
C. S. BRADLEY.
ALTERNATING CURRENT ELECTRIC MOTOR.
No. 514,903. Patented Feb. 20, 1894.
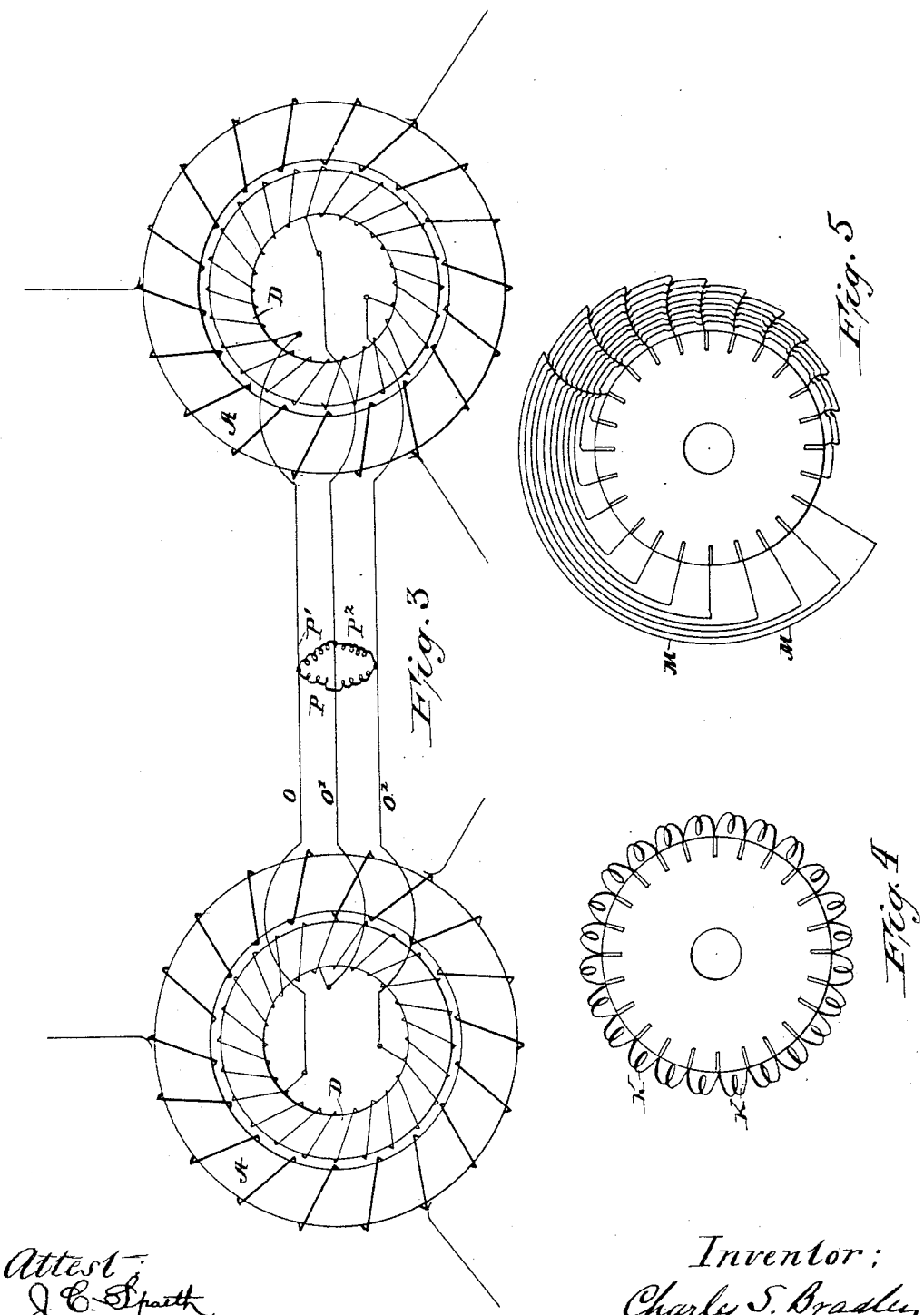

(No Model.) 3 Sheets—Sheet 3.

C. S. BRADLEY.
ALTERNATING CURRENT ELECTRIC MOTOR.

No. 514,903. Patented Feb. 20, 1894.

Witnesses
C. E. Ashley
H. W. Lloyd.

Inventor
Charles S. Bradley
By his Attorneys
R. J. Read & Rogers

UNITED STATES PATENT OFFICE.

CHARLES S. BRADLEY, OF AVON, NEW YORK.

ALTERNATING-CURRENT ELECTRIC MOTOR.

SPECIFICATION forming part of Letters Patent No. 514,903, dated February 20, 1894.

Application filed September 27, 1892. Serial No. 447,080. (No model.)

*To all whom it may concern:*

Be it known that I, CHARLES S. BRADLEY, a citizen of the United States, residing at Avon, in the county of Livingston and State of New York, have invented certain new and useful Improvements in Alternating-Current Electric Motors; and I do hereby declare the following to be a full, clear, and exact description of the invention, such as will enable others skilled in the art to which it appertains to make and use the same.

This invention relates to that type of alternating current motors in which a rotary magnetic field is developed in one element and acts inductively upon a secondary circuit inclosing the other element. The element carrying the secondary circuit will move almost in synchronism with the rotary field when such a motor is operating under no load. At such times there being almost no slip between the rotary field and the secondary circuit there is no induction developed in the latter and the motor has little torque. When the motor is loaded the secondary circuit lags behind the rotary field creating a certain amount of so-called "slip" between the secondary circuit and the poles of the rotary field. The induction in the secondary circuit is greater as the percentage of this slip increases or as the motor is more heavily loaded. When starting under load the induction upon the secondary circuit of such a motor is so great as to cause the poles developed by the said secondary circuit to overpower the poles of the rotary field, and the motor operates with small torque. As the motor rises in speed the percentage of slip becomes less and the induction is reduced to an amount where the poles developed thereby can co-operate more effectively with the poles of the rotary field; and the strongest torque is developed at a speed where the motor approaches synchronism.

It is the object of my invention to enable such a motor to be started under load with strong torque and to vary the speed and torque as may be desired during the operation of the motor.

I carry out my invention by providing the motor with two rotary fields operating upon a common secondary element and providing in the secondary circuit which polarizes such element two paths for the current, one of which will be selected when the poles of the rotary fields occupy the same inductive relation to the secondary circuit, and the other of which will be selected when the poles occupy a different inductive position with reference to the secondary circuit.

The several features of novelty of my invention will be more particularly hereinafter described and will be definitely indicated in the claims appended to this specification.

Figure 1:
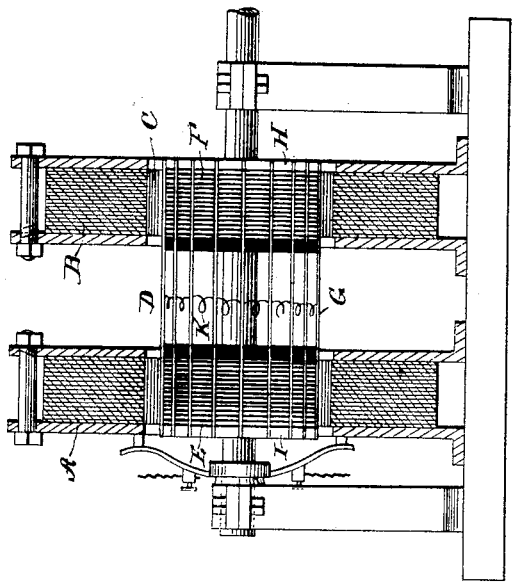
Figure 7:
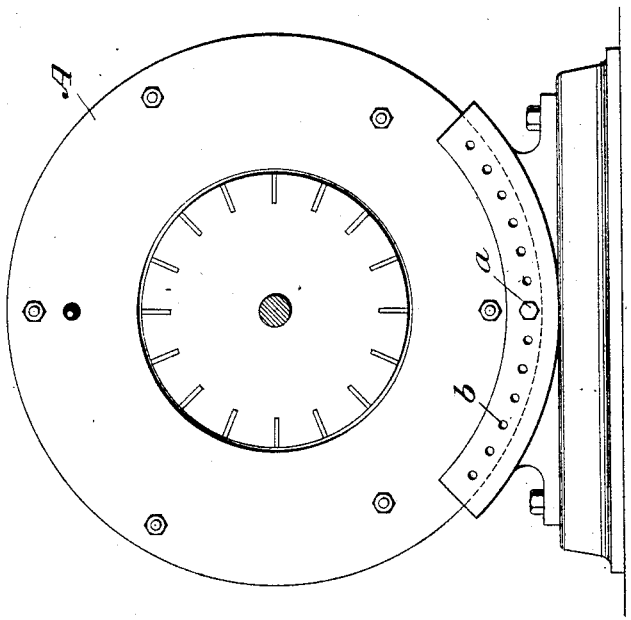
Figure 6:
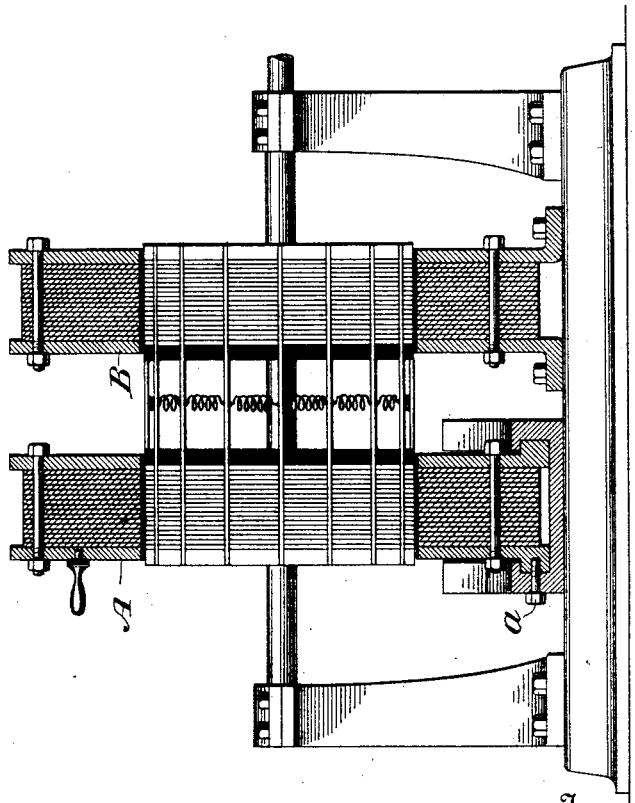

In the accompanying drawings which illustrate my invention, Figure 1 is a part sectional view of a motor embodying my improvements. Fig. 2 is a diagram showing a mode of shifting the poles of one magnetic field so as to give said poles a lead or lag over the poles of the other magnetic field. Fig. 3 is a diagram showing a modified form of a secondary element. Fig. 4 is a diagram illustrating one mode of connecting the secondary circuit so as to provide the selective paths referred to above, and Fig. 5 is another diagram showing another mode of making the connections. Figs. 6 and 7 are sectional views of a modification in which the relative positions of the poles in the two magnetic fields may be changed by bodily shifting one of the elements in which one magnetic field is developed.

Referring first to Fig. 1, A and B represent two stationary elements fixed upon a suitable base and formed of superposed laminæ of soft iron. The polarizing coils are wound upon internally projecting teeth, indicated at C, so as to develop in the ring core a rotary magnetic field when connections with the windings are made with a polyphase alternating current circuit in a manner well understood in the art. In inductive relation to the two cores is placed a rotary element D which may be provided as shown in the drawings with two independent laminated cores E and F, or may have a single core extending throughout both cores of A and B. Upon this element is placed a low resistance secondary circuit preferably composed of a series of longitudinal copper bars G set in radial grooves formed in the pile of laminæ constituting the core and united at the ends by conducting plates H, I, forming a completely closed metallic circuit. When the poles of the rotary field developed in the elements A and B occupy the same inductive position with relation to the secondary element the two electro-motive-forces acting in any of the copper bars will be in the same direction, and the induced current will flow from one conducting head H through the bars to the other conducting head I and back by way of the bars on the other side of the element. When the motor is starting and the slip is very great this induced current is so strong as to induce poles in the secondary element which overpower the poles of the rotary field.

It is customary in this type of motor to introduce into the secondary circuit an external resistance connected with the circuit by means of brushes and contact rings, and this resistance serves to tone the effect of the current when the motor is starting, reducing the polarization of the armature to a degree at which it will co-operate to better advantage with the poles of the rotary field. In order to obviate the necessity of employing such an external resistance and to dispense with the contact rings and brushes, I provide an auxiliary path in the secondary circuit by connecting the bars by conductors of comparatively high resistance at a point between the rotary fields. This is indicated in Fig. 1 by the looped lines K connecting successive bars of the secondary circuit. I also provide means by which the poles of one rotary field may be shifted so as to give them a lag or lead over the poles of the other field. For example, in Figs. 1 and 2 upon a boss attached to one of the standards is mounted a sleeve carrying three contact arms adapted to lead a triphase current to three equidistant points of the winding of the element A. By giving these contact arms a partial rotation by means of the handle L the poles of the element A may be shifted with respect to the poles of the element B so that the poles of the two rotary fields may be made to co-operate in developing an electro-motive-force in the several secondary conductors or may be made to oppose one another. When acting in conjunction the current induced in the secondary circuit will pass directly across the bars from one head H to the other, but when they oppose one another more or less current, depending on the degree of opposition, will be shunted through the high resistance path formed by the loops K connecting the several bars. This path although continuously closed takes no current when the electro-motive-forces induced in any bar by the two rotary fields are coincident in phase, as a path of low resistance is open at such times, but when the phases differ the two electro-motive-forces oppose each other more or less and unite in sending current over the high resistance path. Thus we have at hand a means of controlling the speed and torque of the motor without the introduction of external resistance.

In starting the motor the handle L is shifted so as to bring the poles of one rotary field in opposition to those of the other. In any conducting bar of the secondary circuit there is then in action two electro-motive-forces opposed in direction and the only path for the current is through the high resistance circuit K which by reason of its high resistance weakens the strength of the current and prevents the secondary poles from overpowering the poles of the rotary field. The motor therefore starts with strong torque. As the motor rises in speed and the amount of slip and therefore the amount of induction decreases between the poles of the field and the secondary element, the handle L is shifted so as to bring the poles of A into a closer or absolute conjunctive relation to the poles of B, thus reducing the degree of opposition of the electro-motive-forces, when the current will flow across the bars of the secondary circuit from one head to the other and the secondary current will maintain the pole strength of the secondary element. These provisions result in effect in weakening the strong induced current at starting by forcing it to traverse a path of high resistance and in offering to it a path of low resistance when the motor increases its speed and when there is consequently a less percentage of slip and a weaker induced current, thus permitting the establishment of a strong torque at any speed, or permitting the speed of the motor to be varied when operating under load.

In Figs. 4 and 5 are shown two modes of establishing the high and low resistance circuits in the secondary element. In Fig. 4 the loops K, K, connecting successive conducting bars at a point between the two rotary fields provide a path of comparatively high resistance. In Fig. 5 the several bars of the circuit which are acted upon by opposite poles of the rotary field are connected by means of thin rings of a suitable resisting material indicated by the curved lines M, M. When one rotary field is shifted with reference to the other and there is a difference of phase in the electro-motive-forces developed at the two sides of the secondary circuit more or less current will be diverted over the path M, M, adding resistance to the circuit and weakening the magnetizing effect of the secondary current. Other modes of accomplishing the same result might be adopted, it being only necessary that a path of high resistance shall be offered to the secondary current when the motor is starting.

In Fig. 3 is diagrammatically indicated a method of accomplishing the results contemplated by my invention where independent secondary elements are acted upon by the two rotary fields. In this case, as before, means are provided for shifting the poles of one field with relation to the other, as indicated by the three spring contacts of the line circuit with element A, and the two secondary circuits are connected at a number of points by conductors O, O', O², and these several conductors are cross connected by resistances P, P', P². When the electro-motive-forces induced in the two secondary circuits operate in conjunction current flows from one secondary circuit to the other and back by way of the conductors O, O', O², but when they act in opposition the current is forced to traverse the paths indicated by P, P', P², which, by reason of the high resistance offered, reduces the magnetizing effect of the current and accomplishes the desired result.

It will be understood that instead of shifting the poles of one element with reference to those of the other by means of the switch described, any means of changing the relation of the two fields to the armature might be employed. For example, in Figs. 6 and 7 is illustrated a system in which the element A may be shifted bodily with reference to the element B, so that the electro-motive-force due to the poles of element A will oppose to a greater or less degree the electro-motive-force due to the element B. This result may be accomplished in any suitable manner, the system shown comprising an arc-shaped support in which element A is mounted so as to be capable of shifting circumferentially and locked in any one of a number of positions of adjustment by a set screw $a$, entering a recess in one of the side plates of the element, and adapted to be inserted in one of a number of openings $b$ provided in the arc-shaped support for the element.

I have herein described a two pole motor. I desire to have it understood however that the invention is equally applicable to multipolar motors. In the latter class of machines the poles shift progressively around the ring core so as to produce in reality a rotary multipolar field.

I deem it unnecessary to further describe such multipolar motors as their construction is well understood by those familiar with so-called "rotary current" motors.

Having thus described my invention, what I claim as new, and desire to secure by Letters Patent, is—

1. An alternating current motor having one element wound to develop progressively shifting magnetic poles, and the other element provided with a closed secondary circuit inductively related to the shifting poles, means for developing opposing electro-motive-forces in the secondary circuit and a common path of relatively high resistance forming a multiple arc circuit for currents due to the opposed electro-motive-forces.

2. An alternating current motor having two primary elements and a secondary element inductively related to both, and means for shifting the poles of one primary element with reference to those of the other to develop opposing electro-motive-forces in the secondary element, said secondary element being provided with a common path of high resistance for the current due to such opposing electro-motive-forces.

3. An alternating current motor having two ring cores wound to develop two rotary magnetic fields, a secondary element having a closed circuit in inductive relation to both cores, and means for shifting the poles of one field with relation to those of the other, to develop opposing electro-motive-forces in the secondary circuit, the secondary circuit being provided with a path of high resistance forming a multiple arc circuit for currents due to the opposed electro-motive-forces for the purpose described.

4. An alternating current motor having one element wound to develop progressively shifting poles and the other element provided with a closed secondary circuit of low resistance inductively related to the shifting poles, and means for developing when desired opposing electro-motive-forces in the secondary circuit, said circuit being provided with a high resistance shunt forming a multiple arc circuit for currents due to the opposed electro-motive-forces.

In testimony whereof I affix my signature in presence of two witnesses.

CHARLES S. BRADLEY.

Witnesses:
HENRY J. MILLER,
OCTAVIA STEWART.